United States Patent
Horii et al.

(10) Patent No.: US 8,276,153 B2
(45) Date of Patent: Sep. 25, 2012

(54) METHOD AND SYSTEM FOR DIVIDING AND EXECUTING ON-LINE TRANSACTION PROCESSING IN DISTRIBUTED ENVIRONMENT

(75) Inventors: Hiroshi Horii, Yamato (JP); Hisashi Miyashita, Machida (JP); Hideki Tai, Yokohama (JP); Mikio Takeuchi, Zama (JP)

(73) Assignee: International Business Machines Corporation, Armonk, NY (US)

( * ) Notice: Subject to any disclaimer, the term of this patent is extended or adjusted under 35 U.S.C. 154(b) by 1306 days.

(21) Appl. No.: 11/964,930

(22) Filed: Dec. 27, 2007

(65) Prior Publication Data

US 2008/0163221 A1 Jul. 3, 2008

(30) Foreign Application Priority Data

Dec. 27, 2006 (JP) ................................ 2006-352292

(51) Int. Cl.
*G06F 9/46* (2006.01)
(52) U.S. Cl. ... 718/106; 718/101; 707/704; 707/999.01; 707/999.2
(58) Field of Classification Search .................. 718/101, 718/106; 707/704, 999.01, 999.2
See application file for complete search history.

(56) References Cited

U.S. PATENT DOCUMENTS

| | | | | |
|---|---|---|---|---|
| 5,864,679 A | * | 1/1999 | Kanai et al. | 709/238 |
| 5,956,489 A | * | 9/1999 | San Andres et al. | 709/221 |
| 6,681,226 B2 | * | 1/2004 | Bretl et al. | 707/703 |
| 7,111,290 B1 | * | 9/2006 | Yates et al. | 717/158 |
| 7,206,805 B1 | * | 4/2007 | McLaughlin, Jr. | 709/203 |
| 2002/0174162 A1 | | 11/2002 | Perks et al. | 718/101 |
| 2003/0072263 A1 | * | 4/2003 | Peterson | 370/235 |
| 2006/0136454 A1 | * | 6/2006 | Tchouati et al. | 707/101 |

OTHER PUBLICATIONS

Maruyama, "Automated Method-Extraction Refactoring by Using Block-Based Slicing", SSR'01 Toronto, Ontario, Canada, pp. 31-40 (May 2001).

\* cited by examiner

*Primary Examiner* — Jennifer To
*Assistant Examiner* — Abu Z Ghaffari
(74) *Attorney, Agent, or Firm* — Ido Tuchman; William J. Stock

(57) ABSTRACT

A method, system and computer program capable of executing a transaction in a scalable manner by dividing and then executing the transaction in a distributed environment. In an embodiment of the invention, a system divides and then executes a transaction in a distributed environment. The system includes means which divides the transaction processing into an optimistic process which unlikely causes conflicts and a pessimistic process which likely causes conflicts; a first server; and a second server. The first server includes a first transaction execution unit for executing the optimistic process; and a transaction log transmission unit for transmitting a result of the execution of the optimistic process to the second server. The second server includes a transaction log receiving unit for receiving the transmission log; and a second transaction execution unit for executing the pessimistic process.

7 Claims, 4 Drawing Sheets

METHOD AND SYSTEM FOR DIVIDING AND EXECUTING ON-LINE TRANSACTION PROCESSING IN DISTRIBUTED ENVIRONMENT

CROSS-REFERENCE TO RELATED APPLICATIONS

This application claims priority under 35 U.S.C. §119 to Japanese Patent Application No. 2006-352292 filed Dec. 27, 2006, the entire text of which is specifically incorporated by reference herein.

BACKGROUND OF THE INVENTION

The present invention relates to dividing a transaction into processes based on optimistic locking and pessimistic locking, and to executing the processes in a distributed environment during on-line transaction processing.

In recent years, on-line transaction processing (OLTP) systems, which employ a form of directly accepting processing from a large number of users, have been increasing as the systems have become web based. For this reason, the demand for better processing performance and scalability of the systems has been increasing. In order to make such systems scalable, generally, a multilayer architecture constituted of multiple application servers and multiple database management systems (hereinafter, referred to as a DBMS) is employed. It is preferable that processing in the application servers be designed so as to support scale-out in general. However, unless the processing for a database access and the processing relating to a DBMS are carefully designed, a bottleneck in the database access is generated, so that the application servers cannot be scaled out.

A concurrency control mechanism used in a large number of OLTP systems, today, is a mechanism termed as a pessimistic concurrency control (hereinafter, simply referred to as pessimistic CC) mechanism. Under pessimistic CC, a lock acquisition process is performed in a DBMS upon access of data. Such a method allows conflicts of reading and writing between transactions to be securely controlled. However, since a lock acquisition process needs to be performed via communications, network delays may occur. For this reason, the pessimistic CC has a problem of poor scalability. In addition, the load is concentrated on the DBMS.

On the other hand, as an effective technique for solving the problem of the poor scalability of pessimistic CC, there is an optimistic concurrency control (hereinafter, simply referred to as optimistic CC) mechanism. Based on the assumption that conflicts of locks barely occur, under optimistic CC, transaction processing is continuously performed without acquiring locks, and conflicts of reading and writing are checked (validated) collectively at the time of committing a transaction to a DB. The transaction is committed to the DB only in a case where there is no conflict of reading and writing. In a case where there are conflicts of reading and writing, re-execution of the transaction is attempted. Optimistic CC is a processing method with excellent scalability since a lock acquisition request is not issued to the DBMS during the middle of the transaction processing under optimistic CC. However, when there are data accesses (hot spots) where conflicts of reading and writing frequently occur re-executions of the transaction occur so many times that the processing performance of the system is deteriorated.

There are proposed some techniques with excellent scalability for executing transactions by suppressing the cost of locks to the minimum by applying pessimistic CC only to a resource where conflicts of reading and writing likely occur, while applying optimistic CC to other resources. However, in a case where such techniques are utilized, there are also cases where conflicts of locks with respect to the resources frequently occur in a distributed environment due to the influence of the execution of the transaction from the acquisition of a lock till the releasing of the lock, and of network delays.

Furthermore, U.S. Patent Application Publication No. 20020174162 proposes a technique, in which operations of writing to resources in conflict are delayed until immediately before committing a transaction to the resources, and then determinations for writing are made in a concentrated manner at the time of committing the transaction thereto. By use of this technique, it is made possible to perform a process of assigning a sequence number to each of multiple transactions without conflicts in order to commit the multiple transactions to a transactional object. However, it is difficult to apply this technique to processes other than the number assignment process.

The technique disclosed in U.S. Patent Application Publication No. 20060136454 is merely to divide nodes into those processing the transactions by using pessimistic locking, and those process using optimistic locking, and is not to divide transaction contexts. Furthermore, the technique disclosed in U.S. Pat. No. 7,111,290 relates to a computer including a function to execute a program written in command sets different (sub-command sets) from original command sets (main command sets) of the computer, by hardware emulation. The execution of sub-command sets takes longer time than the execution of main command sets due to the overhead related to the emulation. Accordingly, it is desirable for a program written in the sub-command sets to be converted into one written in the main command sets to achieve faster execution. However, the process of conversion itself also takes time. Accordingly, there is a tradeoff relationship within these costs. Moreover, the technique disclosed in U.S. Pat. No. 7,111,290 detects a part having influence on the execution speed by profiling the execution of a program written in sub-command sets, and then converts only the detected part into main command sets. Thereby, the execution becomes faster while the conversion costs are suppressed. As such, the technique disclosed in U.S. Pat. No. 7,111,290 does not necessarily relate to the function to execute transactions in a distributed environment.

BRIEF SUMMARY OF THE INVENTION

Provided is a method and apparatus for dividing a transaction into processes using optimistic locking and pessimistic locking, and then for executing the processes in a distributed environment for on-line transaction processing.

In order to solve the aforementioned problems, in the present invention, there is proposed a system for dividing and executing a transaction in a distributed environment. The system includes: means which divides transaction processing into an optimistic process which unlikely causes conflicts, and a pessimistic process which likely causes conflicts; a first server; and a second server. The first server includes: a first transaction execution unit for executing the optimistic process; and a transaction log transmission unit for transmitting a result of the execution of the optimistic process to the second server. The second server includes: a transaction log receiving unit for receiving the transmission log; and a second transaction execution unit for executing the pessimistic process.

According to the method of the present invention, it is made possible to execute, by use of a method based on optimistic CC, the first half portion of transaction processing, which portion barely causes conflicts of reading and writing, in multiple servers (scalable), and it is made possible to execute, on the basis of pessimistic CC, the last half portion including a hot spot, at a single location or a small number of locations in a concentrated manner. Thereby, a transaction processing program partially including a process, which frequently causes conflicts of reading and writing, can be executed in a larger number of servers.

Although the outline of the present invention has been described so far as a method, the present invention can be grasped as an apparatus, a program or a program product. The program product can include, for example, a recording medium having the aforementioned program stored thereon, or a medium which transmits the program.

It should be noted that the outline of the present invention does not list all of the features required for the present invention, and that other combinations of or sub-combinations of these constitutional elements possibly become the invention.

BRIEF DESCRIPTION OF THE SEVERAL VIEWS OF THE DRAWINGS

For a more complete understanding of the present invention and the advantage thereof, reference is now made to the following description taken in conjunction with the accompanying drawings.

DETAILED DESCRIPTION OF THE INVENTION

Figure 1:
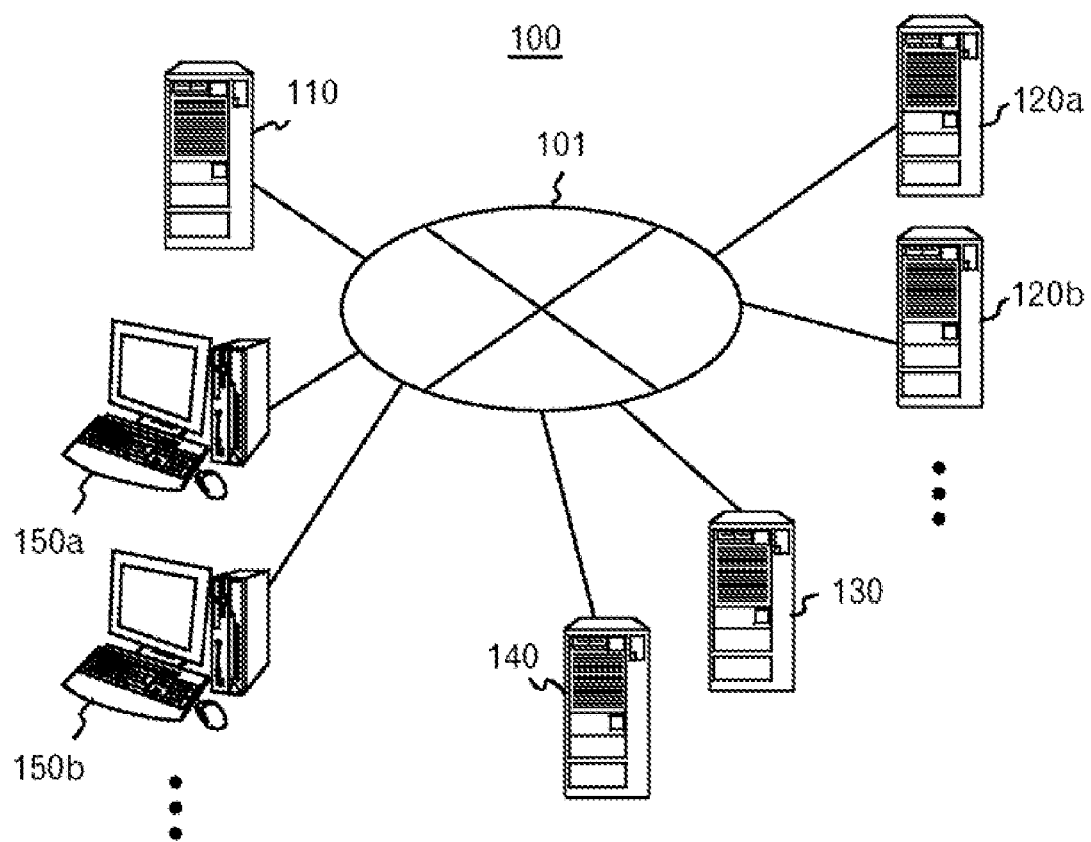
FIG. 1 is an outline diagram of a system of a high level of the present invention, which system divides a transaction into processes on the basis of optimistic and pessimistic lockings, and then executes the processes in a distributed environment during on-line transaction processing.

FIG. 1 is an outline diagram of a system 100 of a high level of the present invention, which system divides a transaction into processes based on optimistic locking and pessimistic lockings, and then executes the processes in a distributed environment for on-line transaction processing. Clients 150a, b . . . transmit a transaction processing request to one of the application servers (first servers) 120a, b . . . via a network 101. In a server 110 previously or dynamically a transaction processing program is divided into processes (SQL) on the basis of optimistic locking and pessimistic locking, and deploys the processes based on optimistic locking (processes which unlikely cause conflicts) in an application server and deploys the processes based on pessimistic locking (processes which likely cause conflicts) in a commit server 130. The application servers 120a, b . . . transmit SQL commands for only a reading portion of SQL based on optimistic locking to a DBMS server 140, and then transmit the results thereof and only a writing portion of SQL to the commit server 130 (second server) as a transaction log. The commit server 130 executes the SQL with respect to the DBMS server 140. It should be noted that the commit server 130 and the DBMS server 140 may be the same server.

Figure 2:
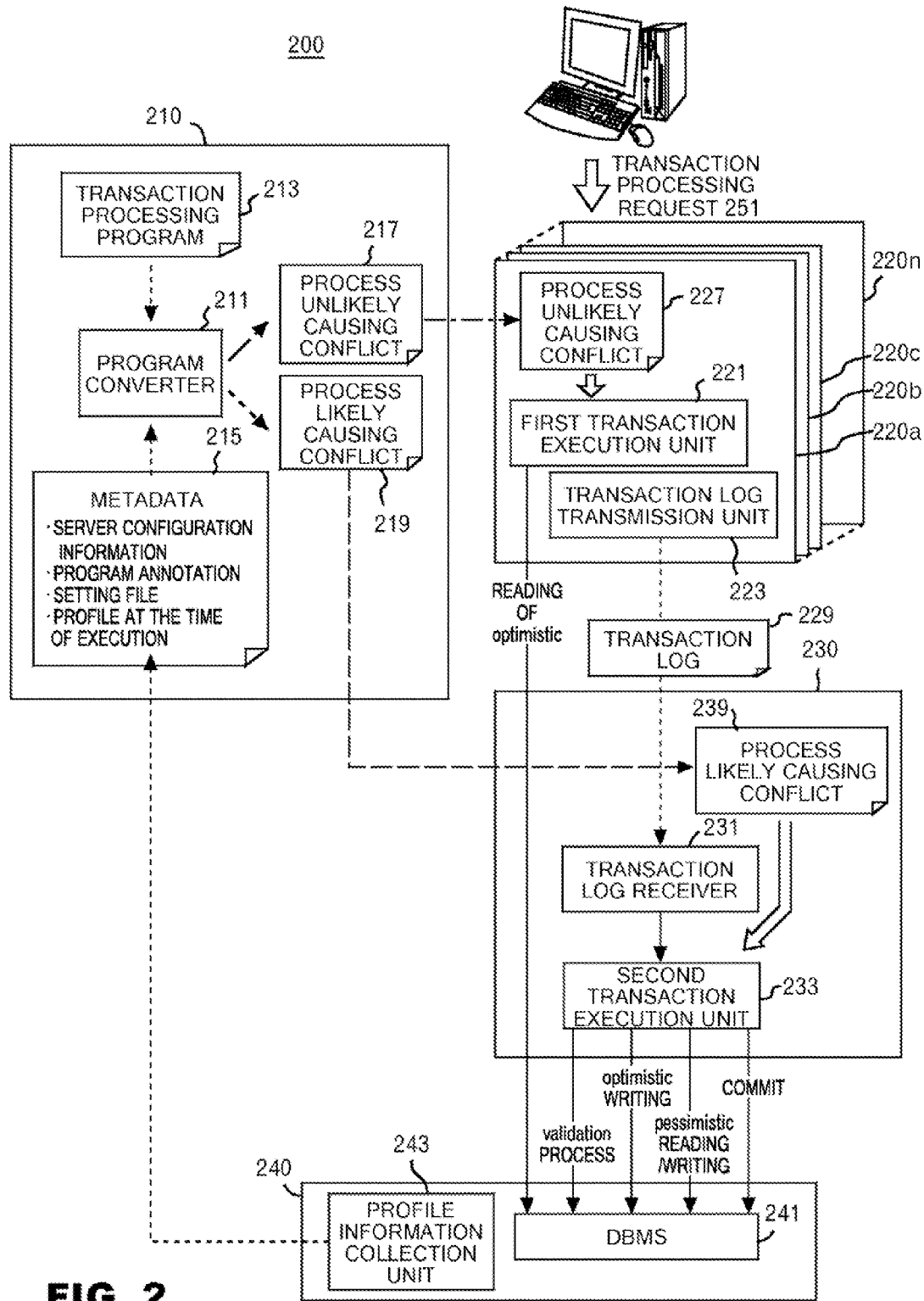
FIG. 2 is a schematic diagram conceptually showing functional blocks of a system which divides a transaction into processes on the basis of optimistic and pessimistic lockings, and then executes the processes in a distributed environment.

FIG. 2 is a schematic diagram 200 conceptually showing functional blocks of a system, which divides a transaction into processes based on optimistic locking and pessimistic locking, and which then executes the processes in a distributed environment. A server 210 includes a program converter 211 which divides a transaction processing program into processes based on optimistic locking and pessimistic locking. The program converter 211 divides, by use of metadata 215, a transaction processing program 213 into a process 217 which unlikely causes conflicts and a process 219 which likely causes conflicts. The metadata 215 includes a profile at the time of executing the transaction, the configuration information of a server, or the like. The program converter 211 uses a publicly known technique such as a program dividing method (Automated Method-Extraction Refactoring by Using Block-Based Slicing, Katsuhisa Maruyama, SSR 2001) using a program slicing, for example. The process 217 which unlikely causes conflicts is delivered to and deployed to application servers 220a, b . . . , n in advance or each time. The process 219 which likely causes conflicts is delivered to and deployed to a commit server 230 in advance or each time.

In a case where a processing request is issued from a client 251, in the application servers 220a, b, . . . , n, a transaction execution unit 221 (first transaction execution unit) executes SQL included in a process 227 which unlikely causes conflicts. However, access to database is actually performed in a data reading process, and also is performed only in a case where the data is read in the same transaction for the first time (this process is the same as that of a general optimistic transaction processing system). As to a writing process, the transaction execution unit 221 transmits the transmission log along with the result of reading out of the data to a transaction transmission unit 223. The transaction transmission unit 223 transmits a transaction log 229 to the commit server 230.

In the commit server 230, a transaction log receiver 231 receives the transaction log 229, and delivers it to a transaction execution unit (second transaction execution unit) 233. The transaction execution unit 233 performs a validation process for all the reading and writing processes included in the transaction log. When there is no problem according to the result of the validation process, the transaction execution unit 233 issues, to a DBMS, commands related to reading and writing processes for a process 239 which likely causes conflicts after executing commands for a writing process of a process which unlikely causes conflicts (process based on optimistic locking) included in the transaction log 229 with respect to a DBMS server 240. Then, the transaction is committed.

The DBMS server 240 includes a DBMS 241 and a profile information collection unit 243. The profile information collection unit 243 collects an access condition to a DB as information. The information is obtained by the server 210 as the profile at the time of execution. The server 210 uses the latest profile at the time of the execution, and examines which SQL likely causes conflicts. The profile is reflected at the time of converting the program by the program converter 211. Specifically, hot spots are analyzed during the execution, and the result of the analysis can be reflected in the dividing of the transaction processing program. The profile information collection unit 243 periodically measures the period of execution time of each SQL by use of the monitoring mechanism of a DBMS, for example, DB2 (registered trademark) of IBM (registered trademark). It should be noted that, in a case where there are more than one DBMS server, there should be more than one commit server as well.

Here, an example of dividing the transaction processing program below will be described.

```
    purchase(prodcode){
      1:    price = SELECT price FROM producttable WHERE code =
    prodcode;
      *2:   stock = SELECT FOR UPDATE inventoryquantity FROM
    inventorytable;
      3:    amount = purchase_quantity_plan(prodcode, price);
      4:    INSERT INTO purchaserecord(productcode, quantity,
    date_and_time)VALUES(prodcode, amount, presenttime);
      *5:   UPDATE inventorytable SET inventory_quantity = stock
    + amount;
    }
```

Suppose that line 2 and line 5 are hot spots in this transaction processing program. This program is divided into the last half portion including the hot spots and the first half portion including portion other than the hot spots by program conversion. The most naive splitting of this program is to split immediately before line 2 which appears first. However, line 3 independent of the data of line 2 is unnecessarily included in the last half portion. In particular, in a case where line 3 is a process which consumes a great amount of resource of the computer, it is desirable to leave as many processes as possible in the first half portion for better scalability. Accordingly, the program should be divided into the following optimistic and pessimistic processes in such a manner that the amount of the process of the last half portion becomes the minimum while not changing the meaning of the program by moving the sentences of lines 3 to 4 to the position before line 2.

```
    -- optimistic process --
    purchase_pre(prodcode){
      1:    price = SELECT price FROM producttable WHERE code
    =prodcode;
      3:    amount = purchase_quantityplan(prodcode, price);
      4:    INSERT INTO purchaserecord(productcode, quantity,
    date_andtime)VALUES(prodcode, amount, presenttime);
            delegateCommit("purchase", prodcode, amount);
    }
    -- pessimistic process --
    purchase_post(prodcode, amount){
      *2:   stock = SELECT FOR UPDATE inventoryquantity FROM
    inventorytable;
      *5:   UPDATE inventorytable SET inventoryquantity = stock +
    amount;
    }
```

At the end of the optimistic process, delegatecommit call is inserted. This delegatecommit call is for starting the transaction log transmission unit 223 shown in FIG. 2.

Although there are various forms of a transaction log in accordance with validation methods, an example of the log is shown below when the transaction of the optimistic process is executed assuming that the validation process in this case is for value comparison. In this example, an assumption is made that the transaction is executed with a parameter, which is prodcode=123456, and that the result is amount=100.

```
    ReadSet = {
      "SELECT price FROM producttable WHERE code=123456", {1280}
    }
    WriteSet = {
      "INSERT INTO purchaserecord(product_code, quantity,
    dateand_time)VALUES(123456, 100, 2006/9/30)"
    }
```

In this transaction log, 1 entry of a reading log(ReadSet) and 1 entry of a writing log(WriteSet) are included. The entry of a reading log is formed of a pair of a query and a list of values which is to be read out as a result of issuing the query. The ReadSet includes a log showing that "a value, 1280, is obtained as a result of issuing a query, which is SELECT price FROM product_table WHERE code=123456", the query corresponding to line 1 of the aforementioned optimistic process. The entry of a writing log is formed of a list of update queries (UPDATE, INSERT, and DELETE statements) which have been issued. The WriteSet includes one INSERT statement. At the time of a validation process to be described later, the query included in the ReadSet is issued, and whether or not the result thereof is the same as the value list of the log is checked. When the values are the same, by issuing an update query in the WriteSet, a commit process of the transaction with respect to the database is performed. In a case where the values are different, this means that conflicts of reading and writing have occurred, so that the transaction is aborted, and re-execution of the transaction is initiated.

Figure 3:
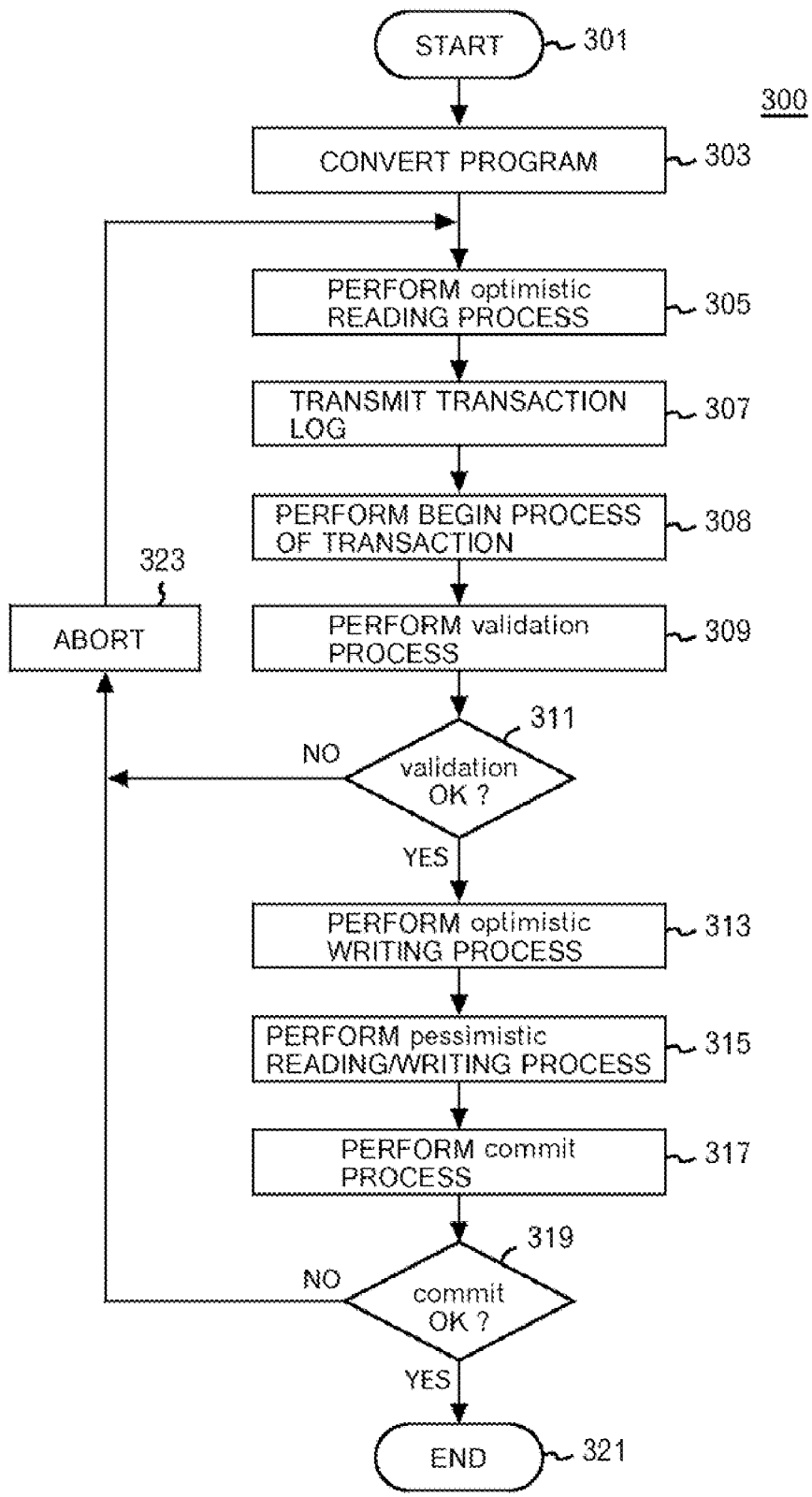
FIG. 3 exemplifies a process flow of the present invention.

FIG. 3 exemplifies a process flow 300 of the present invention. The process starts in step 301. The transformation of a transaction processing program is performed in step 303. Here, the transaction processing program is divided into a process which unlikely causes conflicts (optimistic process) and a process which likely causes conflicts (pessimistic process). In step 305, the transaction processing is started upon receipt of a processing request from a client by the application server. In step 305, reading data for the optimistic process is performed with respect to the DBMS. In step 307, the execution log and the writing process in step 305 are transmitted to a commit server as the transaction log.

In step 308, the commit server which has received the transaction log performs a begin process of the transaction. Thereafter, in step 309, the commit server performs a validation process for checking conflicts of optimistic processes which have been performed up to this time. In step 311, the result of the validation process is checked. In step 311, when there is a problem with the checking of the result of validation process (NO), the process proceeds to step 323, and aborts the processing up to this step. Then, the process returns to step 305, and begins the transaction processing again.

In step 311, when there is no problem with the checking of the result of the validation process (Yes), the process proceeds to step 313, and executes writing data for optimistic process. Then, the process further proceeds to step 315, and performs reading and writing data for pessimistic process. In step 317, the transaction processing is committed with respect to the DBMS (commit process). In step 319, whether or not there is a problem with the result of the commit is checked. In a case where it is determined that there is a problem in step 319 (No), the process proceeds to step 323, and aborts the processing up to this step. Then, the process begins the transaction processing again. In a case where it is determined that there is no problem in step 319 (Yes), the process proceeds to step 321, and ends the process flow.

Figure 4:
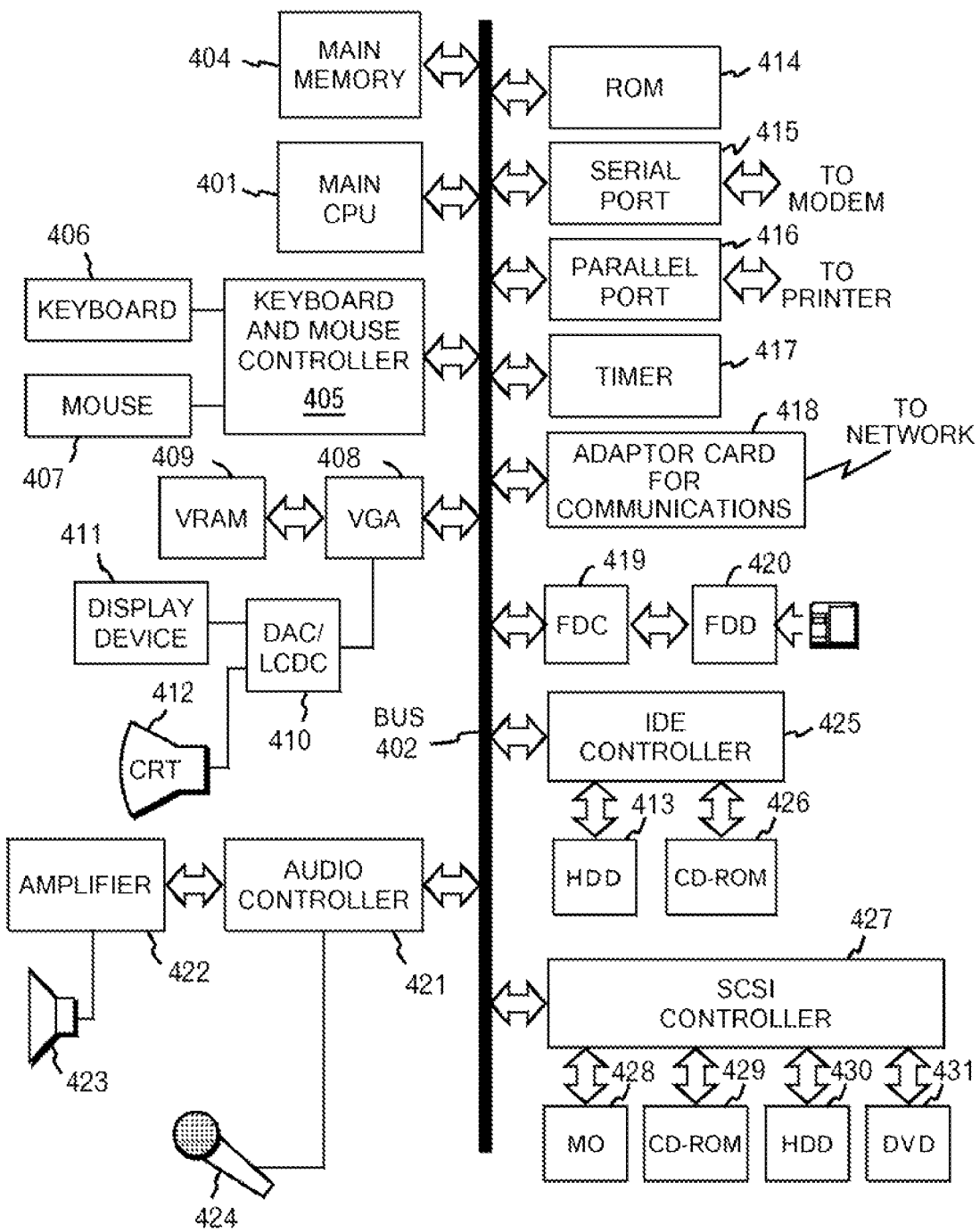
FIG. 4 is a diagram showing an example of a hardware configuration of an information processing apparatus preferably used to realize a client, servers according to an embodiment of the present invention.

FIG. 4 is a diagram showing an example of a hardware configuration of an information processing apparatus preferably used to realize the client terminal 150, the servers 110, 120, 130 and 150 according to the embodiment of the present invention.

The information processing apparatus includes a CPU (central processing unit) 401, and a main memory 404 connected to a bus 402. Removable storage devices (recording media-exchangeable external storage systems) such as hard disk drives 413 and 430, CD-ROM drives 426 and 429, a flexible disk drive 420, an MO drive 428, and a DVD drive 431 are connected to the bus 402 via a floppy disk controller 419, an IDE controller 425, a SCSI controller 427, or the like.

Recording media such as a flexible disk, an MO disc, a CD-ROM disc, and a DVD-ROM disc are inserted into the removable storage device. Computer program codes for implementing the present invention by providing commands to the CPU or the like in corporation with an operating system can be stored in these recording media or the hard disk drives 413, or 430, or a ROM 414. The computer program is executed by being loaded on the main memory 404. The computer program may be compressed, or be divided into multiple pieces, and then stored in multiple media.

The information processing apparatus receives an input from an input device such as a keyboard 406 or a mouse 407 via a keyboard/mouse controller 405. The information processing apparatus is connected, via a DAC/LCDC 410, to a display device 411 for displaying visual data to users.

The information processing apparatus is capable of communicating with another computer or the like by being connected to a network via a network adapter 418 (an Ethernet® card, or a token ring card) or the like. Although not shown, the information processing apparatus is also capable of being connected to a printer or a modem via a parallel port or a serial port, respectively.

By the descriptions which have been provided so far, it is to be easily understood that the information processing apparatus preferably used for implementing the system according to the embodiment of the present invention is implemented by a general information processing apparatus such as a personal computer, a workstation, or a main frame, or a combination of these. However, the constitutional elements of these apparatuses are mere examples, and not all of the constitutional elements are necessarily required constitutional elements of the present invention.

As a matter of course, various modifications including combination of each hardware constitutional element of the information processing apparatus used in the embodiment of the present invention or multiple machines, and allocation of functions thereto can be easily conceived by a person skilled in the art. Needless to say, such modifications are within the concept included in the spirit of this invention.

The system according to the embodiment of the present invention can employ an operating system, which supports a graphical user interface (GUI) multi-window environment, such as Windows® operating system provided by Microsoft Corporation, MacOS® provided by Apple Computer Inc., and UNIX (R) system including X Window System (for example, AIX® provided by International Business Machines Corporation).

From the descriptions provided so far, it can be understood that the system used in the embodiment of the present invention is not limited to a specific operating system environment. Specifically, any operating system can be employed as long as the operation system is capable of providing a resource management function which allows an application software program or the like to utilize a resource of a data processing system. It should be noted that the resource management function possibly includes a hardware resource management function, a file handling function, a spool function, a job management function, a storage protection function, a virtual storage management function or the like. However, the detailed descriptions of these functions are omitted here since they are well known to those skilled in the art.

Moreover, the present invention can be implemented by means of a combination of hardware components, or software components, or a combination of hardware and software components. As a typical example of an implementation by means of a combination of hardware and software components, an implementation by a data processing system including a predetermined program can be cited. In this case, the predetermined program controls the data processing system to execute the processing according to the present invention by making the program to be loaded on the data processing system and to be implemented. This program is constituted of command sets which can be described by an arbitrary language, code or description. Such command sets allow the system to execute a specific function directly or after any one of, or both of, 1. conversion into another language, code, or description, and 2. copy to another medium are performed.

As a matter of course, the present invention not only includes such a program itself, but also a medium having the program recorded thereon within the scope of the invention. A program causing a system to execute the functions of the present invention can be stored in an arbitrary computer-readable recording medium such as a flexible disk, an MO disc, a CD-ROM disc, a DVD disc, a hard disk drive, a ROM, an MRAM, or a RAM. Such a program can be downloaded from another data processing system connected to a communications line, or can be copied from another recording medium for the purpose of storing the program in a recording medium. Furthermore, such a program can be compressed, or divided into multiple pieces, and then be stored in a single medium or multiple recording media. In addition, it should be noted that, as a matter of course, it is also possible to provide a program product in various form to implement the present invention.

As has been described so far, according to the embodiment of the present invention, it is understood that it is possible to easily configure a system in which resource data of a web server is backed up in a client, and which system can be recovered from the resource data backed up in the client in a case where the resource data on the web server is damaged.

It is obvious to those skilled in the art that various modifications and improvements may be made to the embodiment. Moreover, it should be noted that thus modified and improved embodiments are also obviously included in the technical scope of the present invention.

That which is claimed is:

1. A system for executing transaction processing in a distributed environment, comprising:
   a computer processor;
   a divider for dividing the transaction processing into an optimistic process which unlikely to cause conflicts, and a pessimistic process which likely to cause conflicts;
   a first server, including:
   a first transaction execution unit for executing the optimistic process; and
   a transaction log transmission unit for transmitting a transaction log, the transaction log including a record of reading and writing transactions and a result of the execution of the optimistic process to the second server; and
   a second server, including:
   a transaction log receiving unit for receiving the transaction log; and
   a second transaction execution unit for executing the pessimistic process after execution of the optimistic process, if the optimistic process included in the transaction log is validated by the second server for conflicts between the reading and writing transactions; and
   a database management system server including a collection unit for collecting profile information on an execution status of the reading and writing transactions;

wherein the second transaction execution unit further includes a validation function of checking the result of the execution of the optimistic process; and wherein the divider utilizes the profile information, and then divides the transaction processing.

2. The system according to claim 1, wherein:

the first transaction execution unit performs a process of reading from a database in the optimistic process, and the second transaction execution unit performs a process of writing to the database in the optimistic process.

3. The system according to claim 1, wherein a function of the second server and a function of the database management system server are in the second server.

4. A method for executing transaction processing in a distributed environment, the method comprising the steps of:

dividing the transaction processing into an optimistic process which unlikely to cause conflicts and a pessimistic process which likely to cause conflicts;

executing the optimistic process in a first server;

transmitting a transaction log, the transaction log including a record of reading and writing transactions and a result of the execution of the optimistic process from the first server to a second server;

receiving the transaction log by the second server; and executing the pessimistic process in the second server after execution of the optimistic process, if the optimistic process included in the transaction log is validated by the second server for conflicts between the reading and writing transactions; and collecting profile information on an execution status of the reading and writing transactions at a database management system server;

wherein executing the pessimistic process includes checking the result of the execution of the optimistic process; and wherein dividing the transaction processing includes reflecting the profile information, and dividing the transaction processing.

5. The method according to claim 4, further comprising:

reading from a database in the optimistic process in the step of executing the transaction of the optimistic process, and writing to the database in the optimistic process in the step of executing the transaction of the pessimistic process.

6. A computer program embodied in tangible computer memory for executing transaction processing in a distributed environment, the computer program comprising computer code for:

dividing the transaction processing into an optimistic process which unlikely to cause conflicts and a pessimistic process which likely to cause conflicts;

executing the optimistic process in a first server;

transmitting a transaction log, the transaction log including a record of reading and writing transactions and a result of the execution of the optimistic process from the first server to a second server;

receiving the transaction log by the second server; and executing the pessimistic process in the second server after execution of the optimistic process, if the optimistic process included in the transaction log is validated by the second server for conflicts between the reading and writing transactions; and collecting profile information on an execution status of the reading and writing transactions at a database management system server;

wherein executing the pessimistic process includes checking the result of the execution of the optimistic process; and wherein dividing the transaction processing includes reflecting the profile information, and dividing the transaction processing.

7. The computer program according to claim 6, wherein:

the computer code for executing the transaction of the optimistic process includes computer code for reading from a database in the optimistic process; and the computer code for executing the transaction of the pessimistic process includes computer code for writing to the database in the optimistic process.

* * * * *